April 11, 1967 R. R. RAIKE ETAL 3,313,927
PULSE WIDTH COMPARATOR
Filed Oct. 10, 1963
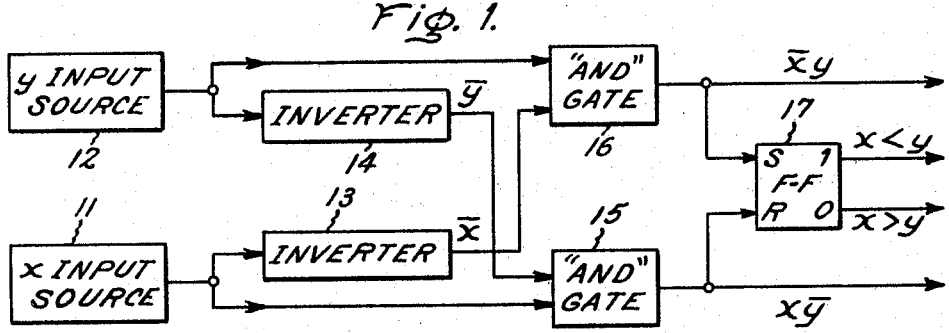
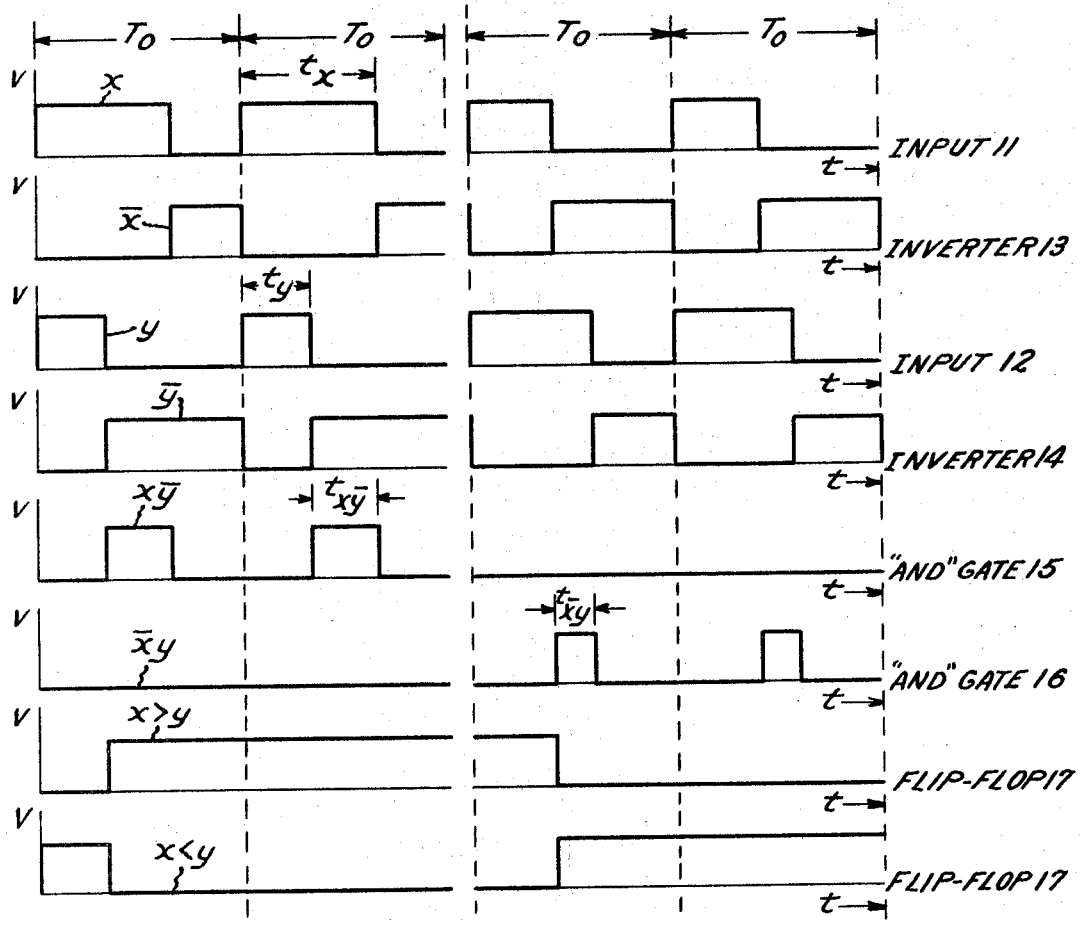
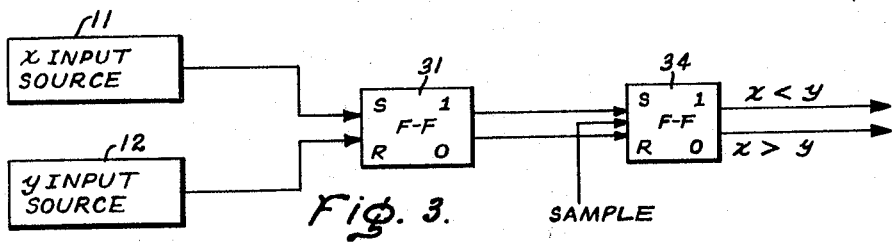

United States Patent Office 3,313,927
Patented Apr. 11, 1967

3,313,927
PULSE WIDTH COMPARATOR
Ronald R. Raike, Endwell, and Hermann Schmid, Binghamton, N.Y., assignors to General Electric Company, a corporation of New York
Filed Oct. 10, 1963, Ser. No. 315,230
2 Claims. (Cl. 235—177)

This invention relates to data processing circuits for comparing a pair of pulse width modulated signals and deriving information signals indicative of which of the compared signals is greater. The present invention is particularly concerned with the fields in which analog computers have been traditionally employed such as in navigation computers, fire control systems, autopilots, and similar systems. It is applicable to data processing of the type in which information quantities are represented by a train of pulses, the pulses occurring during respective system cycles of fixed duration. The pulses are synchronized, normally starting at the beginning of each cycle and terminating after a time interval proportional to the magnitude of the variable being represented in accordance with the system scale factors. The pulses are in the form of voltage waveforms having two levels, one of which represents the presence of a pulse.

In computers and control systems, particularly for real-time data processing, an important operation is the comparison of two variable quantities. While this operation is conceptually simple, in terms of efficient and practical circuits, the realization of comparison operations is usually difficult. A comparison normally requires information both as to the amount of the difference and as to which quantity is larger. In many data processing systems, this information can be represented by a single signal, such as a voltage, where the signal amplitude represents the difference and the signal sign indicates the larger variable. However, in pulse width systems, the pulses usually have a single polarity so that a separate output signal is required to establish which variable is larger.

A natural approach to pulse width comparison is to subtract one pulse from the other. The resultant pulse width signal becomes smaller and smaller as the compared signals approach equal pulse widths but the signal describing which quantity is larger is constant. The desired information involved in comparing two pulse width signals to determine which is larger is actually a discontinuous function. It has one value when the first signal is larger and another value when the first signal is smaller. Where two signals are subtracted, the resultant signal is a continuously variable signal which is proportionately sensitive to the pulse width difference. This results in undesirable gain demands on circuitry implementing the subtraction operation and also on the circuitry responsive to the resultant comparison signals.

Accordingly, it is an object of the invention to provide a pulse width comparator in which the output signal representing which input pulse width signal is greater is not proportional to the pulse width differential.

It is another object of the invention to provide a pulse width comparator which directly compares the input signals with economical circuitry utilizing standard subcircuits and providing high precision operation.

Briefly stated, in accordance with certain objects of the invention, a pulse width comparator is provided with utilizes digital logic type circuits. It has been found that by treating the variable analog pulse width signals such as $x$ and $y$ as digital signals and forming the terms $\bar{x}y$ and $x\bar{y}$ of the "exclusive OR" sum, a pair of signals are produced which represent the amount each signal exceeds the other, in pulse width form. The "exclusive OR" term signals are applied to a digital flip-flop circuit which then produces a signal representing which quantity is greater. When generating the input signal synchronously, the "exclusive OR" term signals represent the appropriate arithmetic difference by their pulse durations and do not require gating. The output signal representing which input is larger is appropriately discontinuous, having high gain.

These and other objects and features of the present invention will become apparent from the accompanying detailed description and drawings in which:

FIGURE 1 is a block diagram of a first embodiment of the invention.

FIGURE 2 is a series of waveforms illustrating the operation of the FIGURE 1 comparator.

FIGURE 3 is a block diagram of a second embodiment of the invention.

Referring now to the drawings, FIGURE 1 illustrates a first embodiment of the comparator invention in block diagram form. A pair of analog signal sources 11 and 12 produce pulse width modulated signals which are proportional to quantities $x$ and $y$ respectively. These signals can represent common analog computer or analog control signals such as, for example, in servo-mechanisms in which $x$ is a signal representing the control quantity and $y$ is a signal representing the feedback quantity. These $x$ and $y$ signals are compared by logic operations and with digital computer type circuits. For the logic operations, the complements of the input quantities are obtained by inverters 13 and 14 which are coupled to the input sources 11 and 12 respectively. The ouputs of inverters 13 and 14 are a train of pulses in which the pulse durations are inversely proportional to $x$ and $y$ durations, that is, the outputs are the complements $\bar{x}$ and $\bar{y}$ in respect to the full scale range of $x$ and $y$, although not in phase with the $x$ and $y$ signals. The logic operations are performed by a pair of "AND" gates 15 and 16 which produce signals representing $\bar{x}y$ and $x\bar{y}$ respectively in response to the signals produced by signal sources 11 and 12 and inverters 13 and 14. These $\bar{x}y$ and $x\bar{y}$ signals are then applied to the "reset" and "set" inputs of set-reset flip-flop 17. As a result, output signals are provided by flip-flop 17 such that a "0" state signal on the normal "1" output represents the conditions $x>y$, and the "1" state signal represents the $x<y$ condition. In the process of this comparison, the comparator also makes available convenient pulse width signals which have a time duration proportional to the difference between the $x$ and $y$ quantities. These signals are the outputs of the "and" gates 15 and 16 which are $x\bar{y}$ and $\bar{x}y$, respectively. These two output signals are in effect gated, in that each one produces no difference output if the other does. Accordingly, these output signals can be used directly such as for unidirectional motor control, or as an $x-y$ (or $y-x$) input to further data processing apparatus.

FIGURE 2 presents a series of waveforms illustrating the operation of the FIGURE 1 comparator. Initially, with the $x$ quantity from input source 11 greater than the $y$ quantity from source 12, the inverter 14 output waveform $\bar{y}$ overlaps the $x$ waveform and the inverter 13 waveform $\bar{x}$ does not overlap $y$. Therefore, "AND" gates 15 and 16 which are respectively responsive to these conditions produce signals representing the overlap conditions. From a logic point of view, gate 15 produces a "1" output during the overlap period representing $x\bar{y}$, while gate 16 produces a "0" (or no pulse) signal representing $\bar{x}y$. The flip-flop 17 in response to these signals is in a "reset" condition with a "0" output indicating that the $x$ input signal is greater than the $y$ input signals. As $x$ and $y$ quantities change, the flip-flop 17 changes to the "1" state when $y$ becomes greater than $x$ because gate 16 produces an appropriate "set" signal. That is, the inverter 13 signal $\bar{x}$ overlaps the input signal $y$ and gate 15 no longer produces a signal which can "reset" flip-flop 17. It will be noted that the "AND" gate outputs $x\bar{y}$ and $\bar{x}y$ are mutually exclusive. Therefore, flip-flop 17 can produce continuous output signals which indicate whether $x$ or $y$ is greater in accordance with the last overlap signal.

In the above description, the outputs of inverter 13 and 14 are signals which do not truly represent $\bar{x}$ and $\bar{y}$ in the same sense as the input signals represent $x$ and $y$. Essentially, this is because $\bar{x}$ and $\bar{y}$ are not synchronized with $x$ and $y$. Pulse width modulation, of the type considered here, is based on a system in which pulses represent quantities by having a duration, from the beginning of a pulse cycle, which is proportional to these quantities. However, as can be seen from an inspection of the FIGURE 2 waveforms, the desired output quantities are obtained by treating the input analog waveforms as if they were digital signals in the manner described.

In implementing the FIGURE 1 comparator, the selection of circuitry for inverters 13, 14, and gates 15, 16 and flip-flop 17 is preferably from economical conventional types. At the present time, solid state circuits utilizing semiconductor active devices provide the best overall characteristics. Performance characteristics of the comparator are primarily determined by the switching speeds of the active devices. With the use of integral packaged circuits for the various digital logic circuits, the comparator is readily implemented with minimum bulk. An example of implementation for the $x$ and $y$ input sources 11 and 12 is the use of standard counters. If digital input signals representing $x$ and $y$ are introduced into the respective counters and a clock source counts down, the counters will generate appropriate pulse width signals. With this implementation, the pulse width comparator operates as a digital comparator having far less complexity than standard digital comparators.

FIGURE 3 illustrates a second embodiment of the invention. In this embodiment, output flip-flop 34 provides signals representing which input is larger as does flip-flop 17 in the first embodiment. The operation can be more readily understood as being one responsive to the order in which the $x$ and $y$ pulses terminate. The flip-flop 31 is of an Eccles-Jordan type which has its "set" and "reset" inputs coupled respectively to the $x$ and $y$ input sources 11 and 12 in the usual manner. That is, because of internal feedback and capacitive coupling of the input signals, flip-flop 31 is only responsive to the trailing edges in the input pulse trains. At the beginning of each steady state cycle, the flip-flop 31 will either be in the "1" state or the "0" state, depending upon which pulse, $x$ or $y$, terminated last during the preceding cycle. At the termination of the shorter input pulse, flip-flop 31 is switched to the opposite state and, at the termination of the longer input pulse, it is switched again, back to the state at the beginning of the cycle (assuming relative magnitudes remain unchanged). In order to sense which state occurs last, flip-flop 34 is coupled to the respective "1" and "0" outputs of flip-flop 31. With the usual "negative logic" at these outputs, a lower level voltage is produced at the "1" output for a "1" state, and a lower level voltage is produced at the complement or "0" output for a "0" state. When a clock (or "sample") pulse is applied to the flip-flop 34 in the usual manner at the end of each cycle, the appropriate logic signals are produced for switching output flip-flop 34 to the same state as input flap-flop 31, thereby sampling its condition.

The FIGURE 3 embodiment also produces pulse width signals representing the difference between the $x$ and $y$ inputs. These signals are generated by the input flip-flop 31 at its output terminals. In utilizing the signals, one of which is the desired "exclusive OR" term, it is necessary that recognition be made of their "negative logic" nature as generated by an Eccles-Jordan flip-flop 31 and that the flip-flop 34 be used to provide the appropriate selection information.

The above embodiments of the invention have similar advantages. No analog process can be performed more accurately that the comparison of two time events. The trailing edges of two pulses constitute two such time events. The accuracy with which the difference between two pulse width signals can be measured is a function of the delay time, rise time, storage time and fall time of these pulses and of how much noise (ripple) there is on these pulses. With present art digital switching circuits, total switching times of less than 100 nanoseconds are easily possible. Comparing this constant noise amplitude of 100 nanoseconds with the repetition period indicates the full scale accuracy. Higher accuracies are, however, always possible by decreasing the switching time or by increasing the repetition time. A decrease in switching time reques higher speed and usually more expensive components. Also, there is a limit as to how much the switching time can be decreased. However, there is no limit as to how much the repetition period can be increased. The larger the repetition period, the longer it takes to get the desired information. As usual, speed of operation must be sacrificed for accuracy.

While particular embodiments of the invention have been shown and described herein, it is not intended that the invention be limited to such disclosure, but that changes and modifications can be made and incorporated within the scope of the claims.

What is claimed is:

1. A pulse width comparator comprising:
   (a) a first source of input signals representing a first information quantity such as $x$ by pulse width modulation;
   (b) a second source of input signals representing a second information quantity such as $y$ by pulse width modulation which provides signals in synchronism with said $x$ pulses;
   (c) first and second inverters responsive to said first and second input sources for producing the inverted signals $\bar{x}$ and $\bar{y}$;
   (d) a first "AND gate," responsive to said first input source and said second inverter throughout a cycle of the input signals, for producing a first "exclusive OR" term signal $\bar{x}y$;
   (e) a second "AND gate," responsive to said second input source and said first inverter throughout the cycle of the input signals, for producing the second "exclusive OR" term signal $x\bar{y}$; and
   (f) a set-reset flip-flop, responsive to said first and second "AND gates," for producing a bistable output signal indicative of which input signal is greater, $x>y$ or $x<y$.

2. A pulse width comparator comprising:
   (a) first and second sources of synchronized input signal pulse trains representing variable $x$ and $y$ quantities by pulse width modulation;
   (b) an Eccles-Jordan flip-flop having set and reset inputs, respectively coupled to said $x$ and $y$ input signals, and having "1" and "0" outputs;
   (c) an output flip-flop having its set and reset inputs responsive to the "1" and "0" outputs of said Eccles-Jordan flip-flop for producing signals representing $x>y$ and $y<x$; and
   (d) sampling means for effectively gating the input to said output flip-flop at the end of each cycle of the pulse train only.

References Cited by the Examiner
UNITED STATES PATENTS 2,900,620  8/1959  Johnson _____ 340—146.2

ROBERT C. BAILEY, *Primary Examiner.*

G. D. SHAW, *Assistant Examiner.*